United States Patent
Fukunaga

(10) Patent No.: US 10,855,148 B2
(45) Date of Patent: Dec. 1, 2020

(54) ELECTRIC MOTOR HAVING GROUNDING CONTACT OF A CONTROLLER

(71) Applicant: Nidec Corporation, Kyoto (JP)

(72) Inventor: Keisuke Fukunaga, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 122 days.

(21) Appl. No.: 15/767,416

(22) PCT Filed: Oct. 14, 2016

(86) PCT No.: PCT/JP2016/080525
§ 371 (c)(1),
(2) Date: Apr. 11, 2018

(87) PCT Pub. No.: WO2017/065268
PCT Pub. Date: Apr. 20, 2017

(65) Prior Publication Data
US 2018/0301961 A1    Oct. 18, 2018

(30) Foreign Application Priority Data
Oct. 14, 2015    (DE) .......................... 10 2015 013 337

(51) Int. Cl.
*H02K 5/15*    (2006.01)
*H02K 5/16*    (2006.01)
(Continued)

(52) U.S. Cl.
CPC .............. *H02K 11/40* (2016.01); *H02K 5/15* (2013.01); *H02K 5/161* (2013.01); *H02K 5/225* (2013.01); *H02K 11/33* (2016.01)

(58) Field of Classification Search
CPC ........ H02K 11/40; H02K 5/161; H02K 11/33; H02K 5/225; H02K 5/15
(Continued)

(56) References Cited

U.S. PATENT DOCUMENTS 5,166,565 A    11/1992    Katsuzawa et al.
7,116,020 B2    10/2006    Armiroli et al.
(Continued)

FOREIGN PATENT DOCUMENTS

JP    04-169010 A    6/1992
JP    2002-044900 A    2/2002
(Continued)

OTHER PUBLICATIONS

Yoshizawa (JP 2011087449 A, IDS on Apr. 11, 2019), Machine translation from JP patent office, Dec. 21, 2019.*
(Continued)

*Primary Examiner* — John K Kim
(74) *Attorney, Agent, or Firm* — Keating & Bennett

(57) ABSTRACT

An electric motor is provided comprising a rotor unit, a stator unit, a housing, and a bearing mechanism. The rotor unit rotates about a vertical center axis. The stator unit is disposed around the rotor unit. The stator unit is fixed inside of the housing. The bearing mechanism rotatably supports the rotor unit relative to the stator unit. The housing comprises a cylindrical wall portion with a bottom and a cover plate, which covers an opening of the cylindrical wall portion. The bearing mechanism further comprises at least two bearings, an upper bearing is sustained by the cover plate and a lower bearing is sustained by the bottom of the housing. The cover plate is made of electrically conductive elements and comprises at least one projection protruding toward the upper outer side of the cover plate so that the at least one projection is configured to contact, directly or indirectly, at least one grounding contact of a controller, which drives and controls the electric motor disposed on the upper outer side of the cover plate. The controller is connected to a ground potential through the cover plate and the motor housing.

9 Claims, 4 Drawing Sheets

(51) Int. Cl.
*H02K 5/22* (2006.01)
*H02K 11/33* (2016.01)
*H02K 11/40* (2016.01)

(58) Field of Classification Search
USPC .................................................. 310/71, 89
See application file for complete search history.

(56) References Cited

U.S. PATENT DOCUMENTS

| | | | | |
|---|---|---|---|---|
| 8,378,540 | B2* | 2/2013 | Furukawa | H02K 3/522 |
| | | | | 310/89 |
| 9,876,409 | B2* | 1/2018 | Kajiyama | H02K 11/40 |
| 2008/0258668 | A1* | 10/2008 | Oguri | H02K 15/16 |
| | | | | 318/538 |
| 2011/0169358 | A1* | 7/2011 | Furukawa | H02K 3/522 |
| | | | | 310/89 |
| 2014/0285041 | A1* | 9/2014 | Lankin | A01D 69/02 |
| | | | | 310/71 |
| 2014/0329420 | A1* | 11/2014 | Magno | H01R 11/26 |
| | | | | 439/803 |
| 2015/0091401 | A1* | 4/2015 | Buerger | H02K 11/0094 |
| | | | | 310/71 |
| 2015/0180301 | A1* | 6/2015 | Kajiyama | H02K 5/161 |
| | | | | 310/89 |
| 2015/0214865 | A1* | 7/2015 | Zhao | H02K 5/04 |
| | | | | 700/276 |
| 2015/0381009 | A1* | 12/2015 | Anderson | A01D 34/00 |
| | | | | 310/68 R |
| 2018/0301961 | A1* | 10/2018 | Fukunaga | H02K 5/15 |
| 2018/0309340 | A1* | 10/2018 | Ogawa | H02K 11/0094 |

FOREIGN PATENT DOCUMENTS

| | | |
|---|---|---|
| JP | 2011-087449 A | 4/2011 |
| JP | 2014-060206 A | 4/2014 |

OTHER PUBLICATIONS

Official Communication issued in International Patent Application No. PCT/JP2016/080525, dated Dec. 27, 2016.

* cited by examiner

ELECTRIC MOTOR HAVING GROUNDING CONTACT OF A CONTROLLER

BACKGROUND OF THE INVENTION

1. Field of the Invention

The present disclosure relates to an electric motor.

2. Description of the Related Art

In modern automotive systems, electronic control units (ECU) or controllers with embedded software are provided for electronic control of components of motor vehicles such as brakes and steerings etc. For controlling an electric motor, a controller is usually provided with and covered by a controller cover and the controller cover is electrically conductive to a motor housing or other components contacting the controller cover. The controller is therewith connected to a ground potential through the controller cover, the motor housing or the other components contacting the controller cover and then a car body.

However, there are some situations in which a controller cover is not electrically conductive to a motor housing or other components contacting the controller cover. This can be the case when the controller cover is made of or is coated by resin, when there is an adhesive or resin between the motor housing and the controller cover or when the other components contacting the controller cover are covered by resin. In these situations, the controller is not connected to the ground potential, and electronic problems can be caused.

Prior art teaches an alternator for motor vehicle, comprising a stator having a plurality of phases and surrounding a rotor which is fixed with respect to a shaft that is arranged to be rotated by the internal combustion engine of the motor vehicle via a transmission device comprising at least one belt and a drive member such as a pulley fixed with respect to the rotor shaft. Bearings are provided and joined together, so as to constitute a support casing adapted to be mounted a fixed part of the vehicle. Prior art teaches that the bearings are used for earthing the alternator, the bearings or a face plate fixed with respect to the bearings carrying the rectifier bridges. At least two power supply sources are both connected between earth and a power supply line for the electrical elements.

SUMMARY OF THE INVENTION

It is an object of the present application to provide effective earthing method to a controller module in a motor.

To this aim, the present invention proposes an electric motor according to claim 1. Preferred embodiments are described in dependent claims.

An electric motor according to the present invention comprises a rotor unit which rotates on a vertical center axis; a stator unit which is disposed around the rotor unit; a housing where the stator unit is fixed inside; a bearing mechanism which rotatably supports the rotor unit relative to the stator unit. The housing comprises a cylindrical wall portion with a bottom and a cover plate which covers an opening of the cylindrical wall portion at the top opposite to the bottom. The bearing mechanism comprises at least two bearings, wherein an upper bearing is sustained by the cover plate and a lower bearing is sustained by the bottom of the housing. The cover plate is made of electrically conductive elements. The cover plate comprises at least one projection protruding toward the upper side of the cover plate so that the at least one projection is configured to contact, directly or indirectly, at least one grounding contact of the controller which drives and controls the electric motor disposed on the upper outer side of the cover plate and the controller is connected to a ground potential through the cover plate and the motor housing.

The above and other elements, features, steps, characteristics and advantages of the present disclosure will become more apparent from the following detailed description of the preferred embodiments with reference to the attached drawings.

BRIEF DESCRIPTION OF THE DRAWINGS

FIGS. 8A, 8B, 8C top views of an electric motor with a controller which achieves the flexible positioning of the controller case according to an aspect of the present invention.

DETAILED DESCRIPTION OF THE PREFERRED EMBODIMENTS

Figure 1:
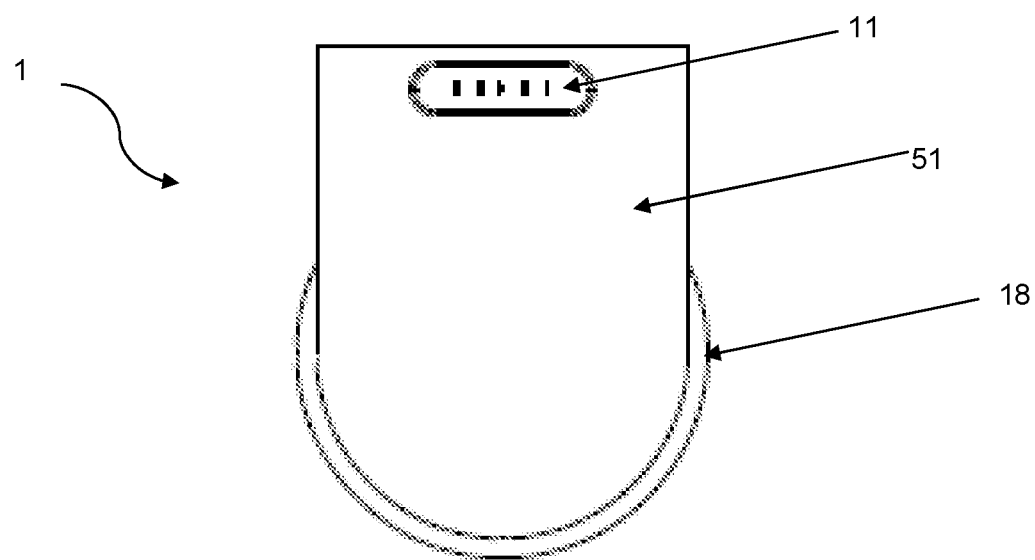
FIG. 1 a top view of an electric motor with a controller according to an aspect of the present invention.
Figure 2:
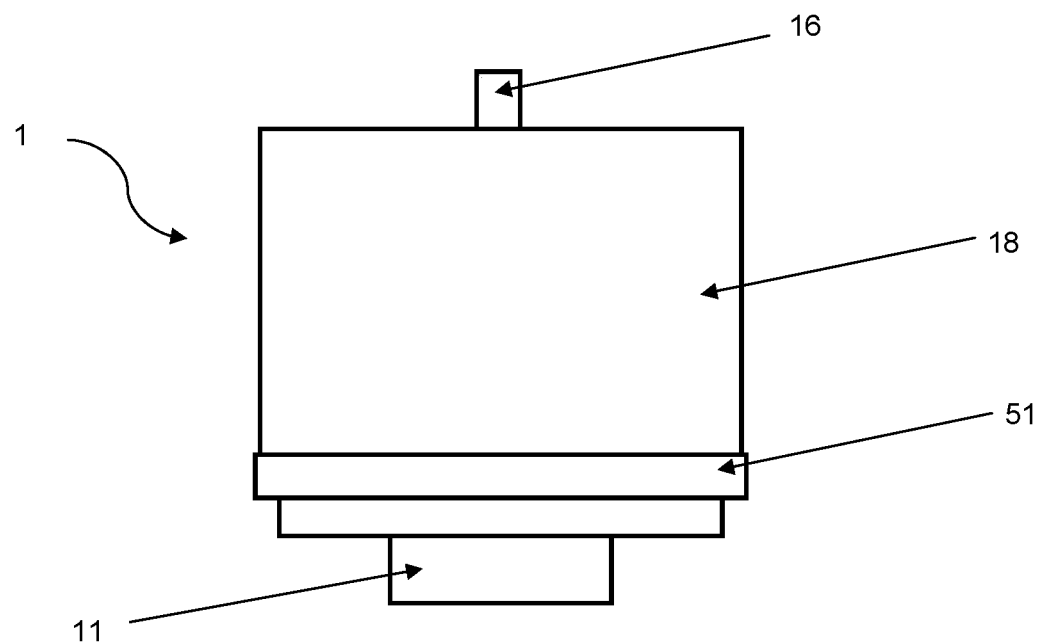
FIG. 2 a side view of an electric motor with a controller according to an aspect of the present invention.
Figure 3:
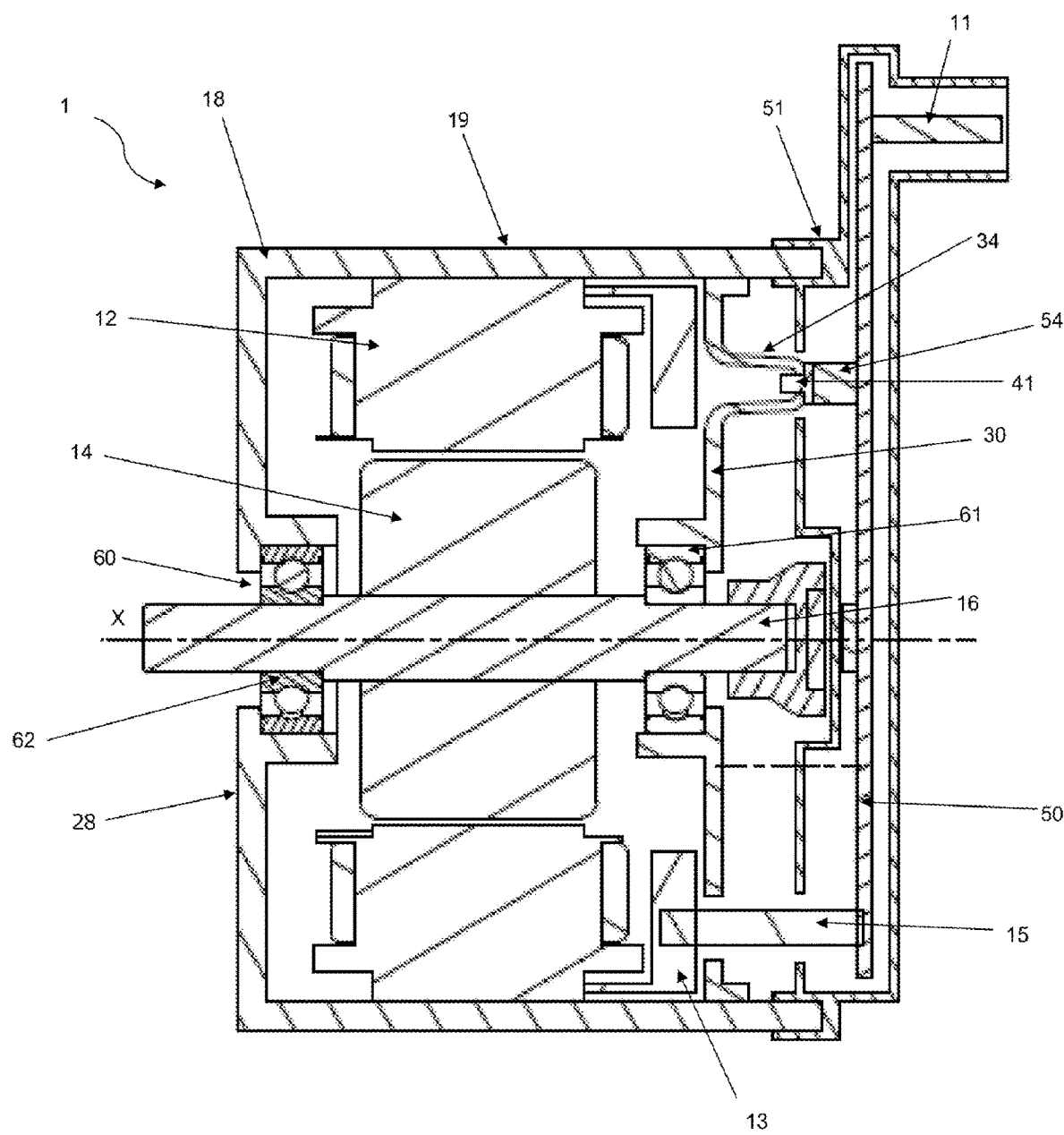
FIG. 3 a sectional view of an electric motor with a controller according to an aspect of the present invention.

FIG. 1 is a top view of an electric motor 1 with a controller case 51; FIG. 2 shows a side view of the motor 1 with the controller case 51 and FIG. 3 shows a sectional view of the motor 1 with the controller case 51.

The electric motor 1 comprises a stator unit 12, a rotor unit 14 with a shaft 16, and a housing 18. The rotor unit 14 rotates about a vertical center axis X, which is preferably formed by the shaft 16. The stator unit 12 is disposed around the rotor unit 14 and is fixed inside the housing 18. A bearing mechanism 60 is provided to rotatably support the rotor unit 14 relative to the stator unit 12. The housing 18 comprises a cylindrical wall portion 19 with a bottom 28 and a cover plate 30, which covers an opening of the cylindrical wall portion 19. The cover plate 30 is disposed at an axial end of the housing 18 opposite to the bottom 28.

A controller 50 is provided to drive and control the electric motor 1. The controller 50 is covered by a controller case 51, which covers at least a part of the controller 50. The controller 50 is disposed on the upper side of the cover plate 30, wherein the cover plate 30 is made of electrically conductive elements in particular made from conductive material.

The cover plate 30 also comprises at least one projection 34, projecting towards the upper outer side of the cover plate 30. The at least one projection 34 can directly or indirectly contact at least one grounding contact 54 of the controller 50. The at least one projection 34 can indirectly contact the at least one grounding contact 54 of the controller 50 via at least one electrically conductive element 41. Hence, the controller 50 can be connected to a ground potential through the cover plate 30 and then the motor housing 18. The at least one grounding contact 54 of the controller 50 may also be protruding from the controller 50 and approach the at least one projection 34.

The stator unit 12 is electrically connected to a busbar 13. The busbar 13 can be an assembly of plural wirings so as to carry electricity to each segment of stator unit 12. Moreover, the busbar 13 is connected to at least one terminal 15 and electrically connected to the controller 50 and ultimately a power supply (not shown) via a connector 11. Therefore, electricity is carried to the stator unit 12 according to the control of the controller 50.

Figure 4:
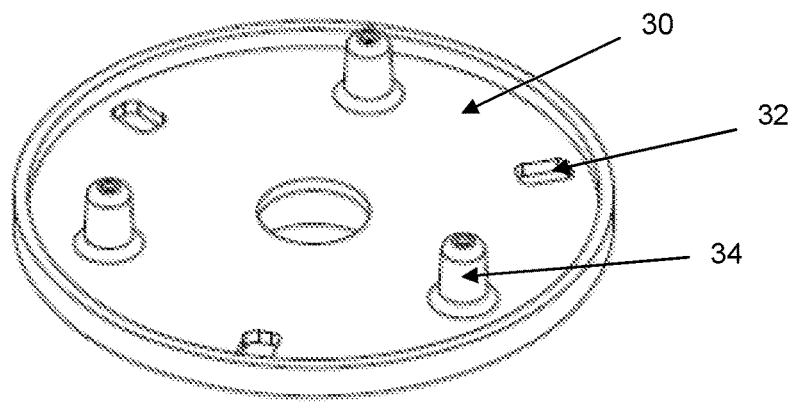
FIG. 4 a view of a cover plate according to an aspect of the present invention.

FIG. 4 shows a view of the cover plate 30. In this embodiment, the cover plate 30 has three projections 34 protruding toward the upper outer side of the cover plate 30 and are disposed at the equal distance from each other in the circumferential direction of the cover plate 30.

Figure 5:
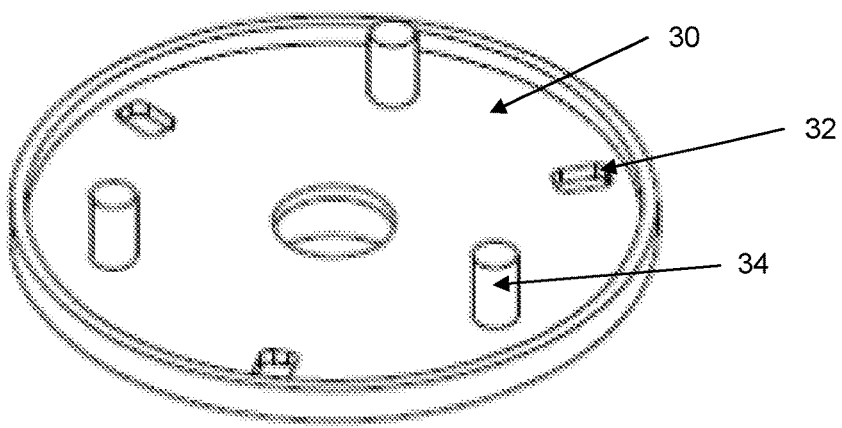
FIG. 5 a view of a cover plate according to an aspect of another embodiment of the present invention.

In this case, three projections are protruded by deep drawing from the cover plate 30 and are formed to be a cup-shape. And at least one of three projections 34 are configured to, directly or indirectly, contact at least one grounding contact 54 of the controller 50 so that the controller 50 can be connected to a ground potential through the cover plate 30 and then the motor housing 18. All of the three projections can contact the corresponding three grounding contacts 54 of the controller 50 and one or two of the three projections 34 can also contact the corresponding one or two grounding contact(s) 54 of the controller 50, respectively. Because these three projections 34 are made from one cover plate 30 and do not need additional parts for grounding, this invention can achieves inexpensive grounding manner. However those three projections 34 are not necessarily formed as a cup-shape and can be achieved by other manners or additional separate inserted parts to the cover plate 30 (FIG. 5). Furthermore, at least one of the projections 34 may be provided with coating comprising a material improving the electrical conductance.

Moreover, those three projections 34 can also be achieved by the manner in which the projections 34 are cut out and raised up outwardly from the cover plate 30. In case those projections 34 are raised up outwardly in the axial direction of the vertical center axis X, the distant projections in the axial direction can be achieved. However, it is not always necessary that those three projections 34 extend in the axial direction. These cut-out and raised-up projections can be formed from the cover plate 30 and can achieve inexpensive grounding manner and those projections 34 can also act as a leaf spring and achieve a good contact position, irrespective of the tolerances of the cover plate 30 and the controller 50 (FIG. 7).

Furthermore, the cover plate 30 has three holes 32 arranged at the equal distance from each other in the circumferential direction of the cover plate 30 between the adjacent two projections 34. In this embodiment, through these three holes 32, the terminals 15 can pass the cover plate 30 from the side of the busbar 13 to the side of the controller 50 and can carry electricity from the power supply to the stator unit 12. Moreover, when the electric motor 1 is a three phase motor, such motor 1 usually has three wirings (u-phase, v-phase and w-phase) and to carry electricity to these three wirings three terminals are optimum.

The cover plate 30 can also has at least one positioning hole (not shown) where the relative position of the controller case 50 can be defined through said at least one positioning hole.

Figure 6:
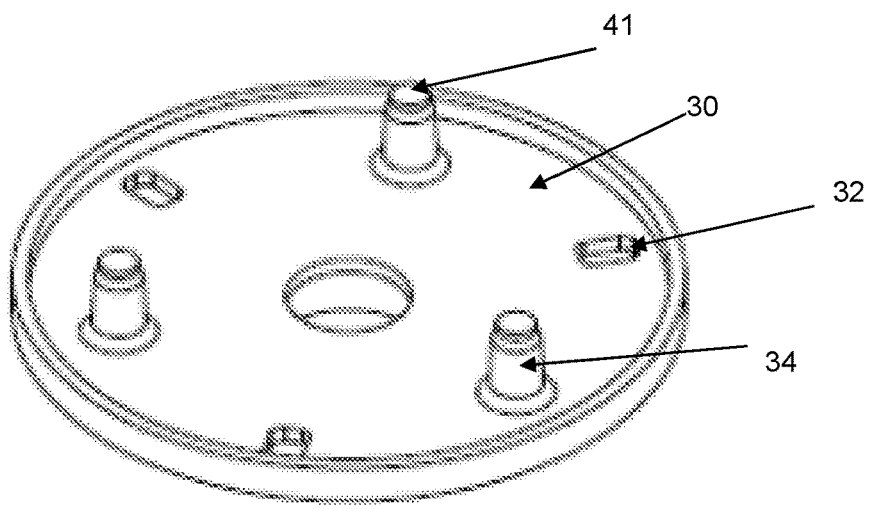
FIG. 6 a view of a cover plate with electrically conductive elements on projections according to an aspect of the present invention.
Figure 7:
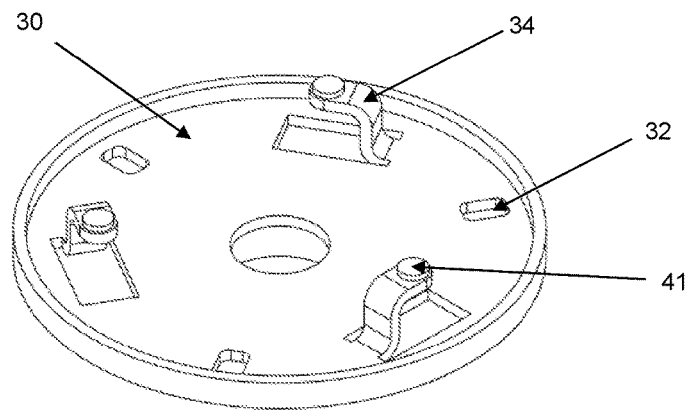
FIG. 7 a view of a cover plate with electrically conductive elements on projections according to an aspect of another embodiment of the present invention.

FIG. 6 shows the cover plate 30 with electrically conductive elements 41 on cup-shaped projections 34 and FIG. 7 shows the cover plate 30 with electrically conductive elements 41 on cut-out and raised-up projections 34.

At least one electrically conductive element 41 can be disposed on the top of the projections 34 as shown in FIG. 6 and FIG. 7. This can achieve more secure grounding, because this allows using more electrically-conductive elements than the cover plate 30 and can securely escape the electric noise toward the cover plate 30 and then the motor housing 18. Moreover, this can be also used as an adjustment of the distance between the projections 34 and the grounding contacts 54 of the controller 50. Therefore, even in the case there is a long distance between the projections 34 and the grounding contacts 54 of the controller 50, at least one electrically conductive element 41 can connect the projections 34 and the grounding contacts 54 of the controller 50. The at least one electrically conductive element 41 is not necessarily one element but can be comprised of plural elements.

The at least one electrically conductive element 41 can be made of elastic material, which enables a stable contact between the electrically conductive element 41 and the grounding contact 54 of the controller 50, thereby guaranteeing the grounding of the controller 50. Moreover, the at least one electrically conductive element 41 can also be coated by corrosion proof material so as to avoid the at least one electrically conductive element 41 from corrosion for a long period.

As can be seen in FIG. 3 the bearing mechanism 60 comprises at least two bearings, an upper bearing 61 being sustained by the cover plate 30 and a lower bearing 62 sustained by the bottom 28 of the housing 18.

Figure 8A:
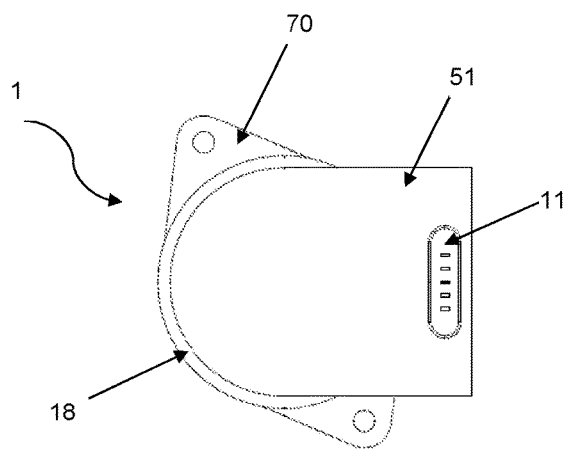
Figure 8B:
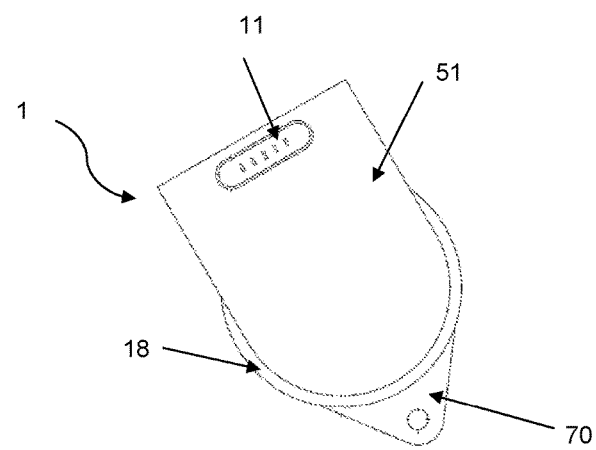
Figure 8C:
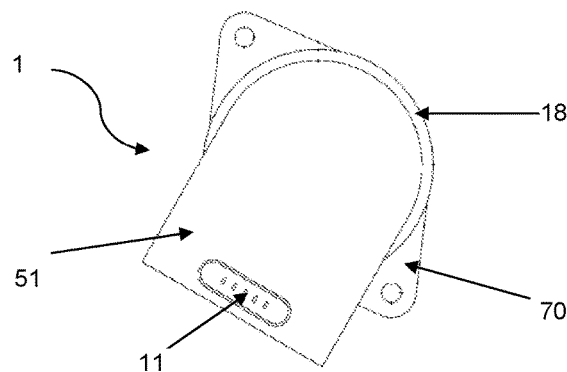

FIGS. 8A, 8B and 8C show the top views of the electric motor 1 with the controller 50 which achieves the flexible positioning of the controller case 51.

In this embodiment, a mounting plate 70 is affixed to the housing 18. Because the terminals are arranged at the equal distance from each other and three protrusions are also arranged at the equal distance from each other, the controller 50 can be positioned and connected to the terminals 15 for every 120 degree. Therefore, in case the controller case 51 is longitudinal and protrude from the motor housing 18. The flexibility of the configuration of the electric motor 1 with the controller 50 can be achieved, as shown in the FIGS. 8A, 8B, and 8C.

This can achieve flexible arrangements of the electric motor 1 with the controller 50 in the limited space of a car body. In particular, when the controller case 51 has a longitudinal shape and protrudes in an radial direction from the motor housing 18, the arrangement manner in the car body is more limited, because other automotive devices and components such as engines, transmissions, chassis, steerings and brakes etc. are occupying the car body and the space and its configuration for motors are limited. This invention can achieve certain flexible positioning of the controller and the electric motor 1 with the controller 50 can be placed according to the space for the electric motor 1.

Features of the above-described preferred embodiments and the modifications thereof may be combined appropriately as long as no conflict arises.

While preferred embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

The invention claimed is:

1. An electric motor, comprising:
a rotor unit, which rotates about a vertical center axis extending in a vertical direction;
a stator unit, which is disposed around the rotor unit;
a housing where the stator unit is fixed inside; and
a bearing mechanism, which rotatably supports the rotor unit relative to the stator unit;
wherein
the housing includes:
a cylindrical wall portion, the stator unit being located inside of the cylindrical wall portion;
a bottom which is provided at a bottom vertical end of the cylindrical wall portion and which extends radially outward; and
a cover plate which is on one side of the stator unit that is opposite to the bottom;
the cover plate is fixed to a radially inner side surface of the cylindrical wall portion and covers an opening of the cylindrical wall portion;
the bearing mechanism includes at least two bearings, one of the at least two bearings is supported by the cover plate and another of the at least two bearings is supported by the bottom of the housing;
the cover plate is made of electrically conductive elements and includes three projections protruding away from the stator unit;
at least a portion of the at least one projection overlaps the radially inner side surface of the cylindrical wall portion when viewed in a radial direction so that the at least one projection contacts, directly or indirectly, at least one grounding contact of a controller which drives and controls the electric motor on one side of the cover plate and the controller is electrically connected to a ground potential through the housing; and
the three projections are disposed at equal distances from each other in a circumferential direction of the cover plate.

2. An electric motor according to claim 1, wherein the at least one projection has a cup-shape.

3. An electric motor according to claim 1, wherein
the cover plate includes at least one through-hole penetrating through the cover plate in the vertical direction; and
the at least one projection includes a first protruding portion extending from an inner side of the at least one through-hole in the vertical direction and a second protruding portion extending to cross the vertical direction from a vertical end of the first protruding portion and contacting, directly or indirectly, the at least one grounding contact of the controller.

4. An electric motor according to claim 1, wherein the cover plate includes three holes arranged at equal distances from each other in the circumferential direction of the cover plate between two adjacent ones of the three projections.

5. An electric motor according to claim 1, wherein the housing includes a mounting plate to fix the motor to a car body.

6. An electric motor according to claim 1, wherein at least one electrically conductive contact element is at an end of the at least one projection so that the at least one electrically conductive contact element directly or indirectly contacts at least one grounding contact of the controller.

7. An electric motor according to claim 6, wherein the at least one electrically conductive contact element is made of elastic material.

8. An electric motor according to claim 4, wherein the at least one electrically conductive contact element is coated by corrosion proof material.

9. An electric motor assembly, comprising:
an electric motor according to claim 1,
a controller which drives and controls the motor,
a controller case which covers at least a portion of the controller; wherein
the controller is on the one side of the cover plate and the at least one projection contacts, directly or indirectly, at least one grounding contact of the controller and the controller is connected to a ground potential through the housing.

* * * * *